United States Patent
Lilly (10) Patent No.: US 8,751,746 B2
(45) Date of Patent: Jun. 10, 2014

(54) QOS MANAGEMENT IN THE L2 CACHE (75) Inventor: Brian P. Lilly, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 196 days.

(21) Appl. No.: 13/326,690

(22) Filed: Dec. 15, 2011

(65) Prior Publication Data

US 2013/0159633 A1    Jun. 20, 2013

(51) Int. Cl.
*G06F 12/08* (2006.01)
(52) U.S. Cl.
CPC ........ *G06F 12/0811* (2013.01); *G06F 12/0888* (2013.01); *G06F 12/0897* (2013.01)
USPC .......................................... 711/122; 711/118
(58) Field of Classification Search
CPC .................. G06F 12/0811; G06F 12/0888; G06F 12/0897
USPC ................................................. 711/118, 122
See application file for complete search history.

(56) References Cited

U.S. PATENT DOCUMENTS

| 7,047,366 | B1 | 5/2006 | Ezra | |
| 7,496,777 | B2 * | 2/2009 | Kapil | 713/324 |
| 8,074,028 | B2 * | 12/2011 | Plamondon | 711/129 |
| 2005/0081009 | A1 * | 4/2005 | Williams et al. | 711/163 |
| 2007/0294418 | A1 * | 12/2007 | Wils et al. | 709/229 |
| 2011/0276972 | A1 | 11/2011 | Chung et al. | |
| 2012/0124591 | A1 * | 5/2012 | Cadambi et al. | 718/103 |
| 2012/0265937 | A1 * | 10/2012 | Resch et al. | 711/118 |

OTHER PUBLICATIONS

Kyle J. Nesbit, Nidhi Aggarwal, James Laudon, James E. Smith "Fair Queuing Memory Systems" pp. 1-12.
Ravi Iyer, Li Zhao, Fei Guo, Ramesh Illikkal, Srihari Makineni, Don Newell, Yan Solihin, Lisa Hsu, Steve Reinhardt, "QoS Policies and Architecture for Cache/Memory in CMP Platforms" pp. 1-12.

* cited by examiner

*Primary Examiner* — Than Nguyen
(74) *Attorney, Agent, or Firm* — Rory D. Rankin; Meyertons, Hood, Kivlin, Kowert & Goetzel, P.C.

(57) ABSTRACT

Methods and apparatuses for assigning a QoS level to memory requests based on the number of currently outstanding memory requests. One or more processors of a processor complex issue memory requests to a L2 cache. The L2 cache controller assigns a QoS level to the memory request based on whether the number of outstanding memory requests is above or below a programmable threshold. If the number is above the threshold, then new requests typically do not impair processor performance since the processor is already waiting for a large number of previous memory requests, and so the new memory request is assigned a low priority level. If the number of outstanding memory requests is below the threshold, then the new memory request is assigned a high priority level.

20 Claims, 7 Drawing Sheets

QOS MANAGEMENT IN THE L2 CACHE

BACKGROUND

1. Field of the Invention

The present invention relates generally to processors, and in particular to methods and mechanisms for determining QoS parameters of processor generated memory requests.

2. Description of the Related Art

Memory latency is an important factor in determining the performance (e.g., instructions executed per second) of a processor. Over time, the operating frequencies of processors have increased dramatically, while the latency for access to dynamic random access memory (DRAM) in the typical system has not decreased as dramatically. Accordingly, the number of processor clocks required to access the external memory has increased.

Caches are utilized within processor architectures to combat the effects of memory latency on processor performance. Caches are relatively small, low latency memories incorporated into the processor or coupled nearby. The caches store recently used instructions and data under the assumption that the recently used information may be accessed by the processor again. Caches can also store prefetched data which is likely to be accessed by the processor in the near future. The caches thus reduce the effective memory latency experienced by a processor by providing frequently accessed information more rapidly than if the information had to be retrieved from the memory system in response to each access.

Caches are often included within an overall memory hierarchy having several different layers. These layers may include non-volatile storage (e.g., hard disk storage), random access memory (RAM), and one or more levels of cache memory. Processor-based systems may include a processor having one or more cores, wherein each of the one or more cores includes one or more cache memories. For example, many processors include at least one processor core having an instruction cache and a data cache, which may be at the top of the memory hierarchy. A cache memory at the top of the memory hierarchy may be referred to as a level one (L1) cache. Many processors also include a level two (L2) cache, which may be shared by the data and instruction caches of a processor core, and furthermore, may be shared by multiple processor cores in multi-core processors.

The memory hierarchy typically includes system memory, and within a system on chip (SoC), many processors and other components and devices may compete for memory access to a system memory via a memory controller. The memory controller may use quality of service (QoS) parameters to arbitrate among memory requests from processor cores and various other sources (e.g., graphics, display pipes, non-real-time agents). For example, in one embodiment, the processor cores can assign either low latency or best effort QoS parameters for memory requests originating from the processor cores. If all traffic is sent as low latency, the overall throughput of the system may be reduced. On the other hand, if all traffic is sent as best effort, this may result in an increase in latency for the processor cores' memory requests.

SUMMARY

In one embodiment, a processor complex may include one or more central processing units (CPUs), a L2 cache, L2 cache controller, and bus interface unit (BIU). The processor complex may be coupled to a memory controller, one or more I/O devices, and various other devices. The L2 cache may be configured to receive memory requests from the CPUs and from the other devices coupled to the processor complex. The L2 cache controller may be configured to monitor the number of outstanding memory requests generated by the CPU(s).

The L2 cache controller may assign quality of service (QoS) parameters to memory requests received from the CPU(s). The L2 cache controller may compare the number of outstanding memory requests to a programmable threshold when determining which QoS parameter to assign to a new memory request. In one embodiment, the memory requests generated by the CPU(s) may be assigned to QoS levels of either low latency or best effort, wherein low latency is a higher priority than best effort.

The latency of the first few memory requests sourced from a CPU may have a significant impact on processor performance, and the system may benefit from treating these memory requests as a high priority. However, if the CPU is already waiting for a large number of previously issued memory requests, then a delay in the servicing of additional memory requests may not significantly impair processor performance. Therefore, in one embodiment, if the number of outstanding memory requests is below the threshold, the QoS parameter assigned to subsequent memory requests may be low latency. If the number of outstanding memory requests is above the threshold, the QoS parameter assigned to subsequent memory requests may be best effort.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a cache . . . " Such a claim does not foreclose the processor from including additional components (e.g., a network interface, a crossbar).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical) unless explicitly defined as such. For example, in a memory controller with five ports, the terms "first" and "second" ports can be used to refer to any two of the five ports.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
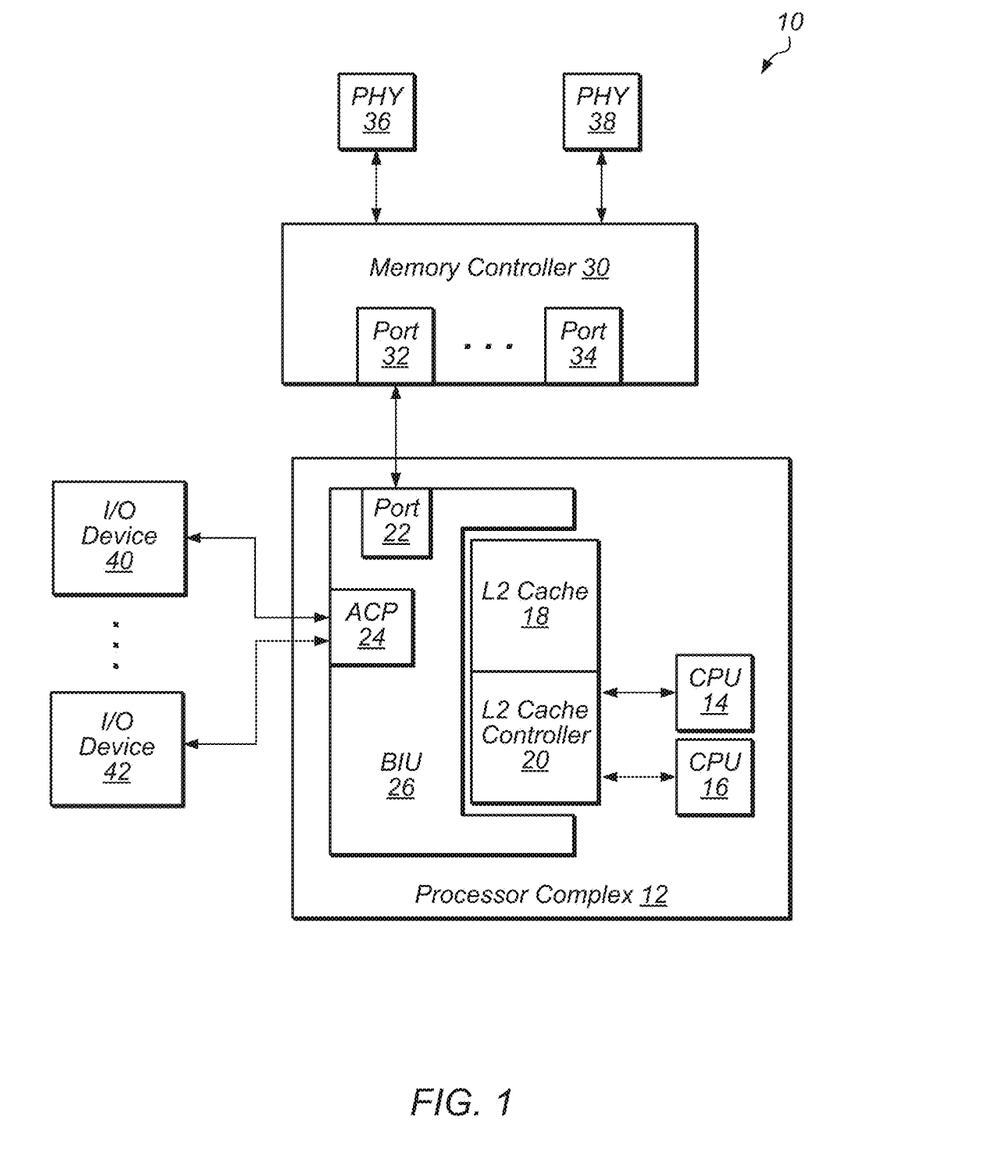
FIG. 1 is a block diagram that illustrates one embodiment of a portion of an integrated circuit (IC).

Referring now to FIG. 1, a block diagram illustrating one embodiment of a portion of an integrated circuit (IC) is shown. In the illustrated embodiment, IC 10 includes a processor complex 12, memory controller 30, memory physical interface circuits (PHYs) 36 and 38, and I/O devices 40 and 42. It is noted that IC 10 may also include many other components and connections not shown in FIG. 1. In various embodiments, IC 10 may also be referred to as a system on chip (SoC), as an application specific integrated circuit (ASIC), or as an apparatus.

Components shown within IC 10 may be coupled to each other using any suitable bus and/or interface mechanism. In some embodiments, these components may be connected using the Advanced Microcontroller Bus Architecture (AMBA™) protocol (from ARM™ Holdings) or any other suitable on-chip interconnect specification for the connection and management of logic blocks. Examples of AMBA buses and/or interfaces may include Advanced eXtensible Interface (AXI), Advanced High-performance Bus (AHB), Advanced System Bus (ASB), Advanced Peripheral Bus (APB), and Advanced Trace Bus (ATB).

Processor complex 12 may include central processing units (CPUs) 14 and 16, level 2 (L2) cache 18, L2 cache controller 20, and bus interface unit (BIU) 26. In other embodiments, processor complex 12 may include other numbers of CPUs. It is noted that CPUs 14 and 16 may also be referred to as processors or cores. CPUs 14 and 16 may include circuitry to execute instructions defined in an instruction set architecture. Any instruction set architecture may be implemented in various embodiments. For example, in one embodiment, the PowerPC™ instruction set architecture may be implemented. Other exemplary instruction set architectures may include the ARM instruction set, the MIPS™ instruction set, the SPARC™ instruction set, the x86 instruction set (also referred to as IA-32), the IA-64 instruction set, etc.

CPUs 14 and 16 may be coupled to L2 cache 18 via L2 cache controller 20, and L2 cache 18 and L2 cache controller 20 may be coupled to BIU 26. BIU 26 may include advanced coherency port (ACP) 24 and memory port 22. BIU 26 may also include various other logic structures to couple CPUs 14 and 16 and L2 cache 18 to various devices and blocks. Other embodiments may include additional levels of cache. For example, in some embodiments, each of CPUs 14 and 16 may have its own cache (e.g., L1 cache). Although not shown in FIG. 1, processor complex 12 may include one or more additional processors, caches, cache controllers, control units, and various other elements and logic.

A system of cache memory management associated with CPUs 14 and 16 may include L2 cache 18, corresponding L2 cache controller 20, and may also include a translation lookaside buffer (TLB) (not shown). L2 cache 18 may include any suitable form of rapidly-accessible memory, such as static random-access memory (SRAM), which may store lines of main memory for use by the respective CPU 14 or 16. L2 cache controller 20 may enable CPUs 14 and 16 to access L2 cache 18 as well as perform techniques calculated to maintain cache coherence among CPUs 14 and 16. Snooping hardware may be integrated into L2 cache controller 20 and may receive snoop requests. In some embodiments, L2 cache controller 20 and L2 cache 18 may be considered separate components. In other embodiments, L2 cache controller 20 and L2 cache 18 together may be considered a single unit, and the term "L2 cache" may refer to both the L2 cache and the L2 cache controller. It is noted that some of the operations and functions described as being performed by a L2 cache controller may be performed by a L2 cache and vice versa.

In one embodiment, L2 cache 18 may be configured to cache instructions and data for low latency access by CPUs 14 and 16. The L2 cache 18 may comprise any capacity and configuration (e.g. direct mapped, set associative). In one embodiment, L2 cache 18 may be configured as a set-associative, writeback cache that is fully inclusive of caches within CPUs 14 and 16. In various embodiments, L2 cache 18 may include a variety of structures configured to support cache functionality and performance. For example, L2 cache 18 may include a miss buffer configured to store requests that miss the L2, a fill buffer configured to temporarily store data, a writeback buffer configured to temporarily store dirty evicted data and snoop copyback data, and/or a snoop buffer configured to store snoop requests. In some embodiments, L2 cache 18 may include a crossbar (not shown) for managing data flow between L2 cache 18 and BIU 26 and between L2 cache 18 and CPUs 14 and 16. In various embodiments, L2 cache 18 may implement arbitration logic to prioritize cache access among various cache read and write requestors. Other variations of L2 cache 18 configurations are possible and contemplated.

I/O devices 40 and 42 are representative of any number of I/O devices that may be connected to processor complex 12 via ACP 24. I/O devices 40 and 42 may include any device configured to or capable of interacting with processor complex 12 and/or system memory. Processor complex 12 may enable I/O devices 40 and 42 to access system memory (not shown) while maintaining coherency between L2 cache 18 and the system memory. Examples of I/O devices 40 and 42 include audio controllers, video or graphics controllers, universal serial bus (USB) controllers, interface controllers, networking media access controllers (MAC) such as Ethernet MACs or WiFi (IEEE 802.11) controllers, and various other devices. It is noted that I/O devices 40 and 42 may also be referred to as peripheral devices or I/O peripherals. In other embodiments, processor complex 12 may be coupled to an I/O processor, peripheral I/O queues, and one or more other devices not shown in FIG. 1.

In some embodiments, IC 10 may include a coherence switch (not shown), and I/O devices 40 and 42 may be coupled to advanced coherency port (ACP) 24 via the coherence switch. In one embodiment, the coherence switch may utilize an AXI master interface to connect to the coherency domain of processor complex 12 via ACP 24. In some embodiments, the coherence switch may be part of an I/O coherency bridge (not shown) or the like.

An originating I/O device 40 or 42 may issue read and write requests to memory. For coherent traffic, the processor complex 12 may provide a mechanism to snoop the cache. If there is a cache hit, the processor complex 12 may provide a response to the originating I/O device. If there is a cache miss, the processor complex 12 may forward the memory request to memory via memory controller 30. Generally speaking, the term "memory request" is not limited to requests that are ultimately responded to by memory, but can also include requests that are satisfied by a cache. It is noted that the terms "memory request" and "memory operation" may be used interchangeably throughout this disclosure.

Memory controller 30 may include circuitry configured to interface to memory (not shown). For example, memory controller 30 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 30 may also be coupled to memory physical interface circuits (PHYs) 36 and 38. Memory PHYs 36 and 38 are representative of any number of memory PHYs which may be coupled to memory controller 30. The memory PHYs 36 and 38 may be configured to interface to memories. Memory controller 30 may receive memory requests from processor complex 12 and other blocks (not shown), and memory controller 30 may perform the corresponding read and write operations to the memory.

Memory controller 30 includes ports 32 and 34, which are representative of any number of ports. Port 32 may be coupled to processor complex 12. Port 34 may be coupled to another block (not shown) of IC 10. For example, in one embodiment, port 34 may be coupled to a real-time peripheral block. In another embodiment, port 34 may be coupled to a graphics controller. Various other blocks and units may be coupled to other ports of memory controller 30 for access to memory.

In some embodiments, quality of service (QoS) parameters may be transmitted with memory requests to memory controller 30. Memory controller 30 may use relative QoS levels to schedule memory requests from the ports to the memory channels. Different traffic types may have different QoS level specifications, and memory controller 30 may be configured to arbitrate among the different types of QoS parameters for scheduling.

In an embodiment, each source may assign a quality of service (QoS) parameter to each memory operation transmitted by that source. The QoS parameter may identify a requested level of service for the memory operation. Memory operations with QoS parameter values requesting higher levels of service may be given preference over memory operations requesting lower levels of service. For example, each of the memory operations may include at least a command (Cmd), a flow identifier (FID), and a QoS parameter (QoS). The command may identify the memory operation (e.g., read or write). A read memory operation causes a transfer of data from the memory to the source, whereas a write memory operation causes a transfer of data from the source to the memory. Commands may also include commands to program the memory controller 30. For example, which address ranges are mapped to which memory channels, bandwidth sharing parameters, etc. may all be programmable in the memory controller 30.

The FID may identify a memory operation as being part of a flow of memory operations. A flow of memory operations may generally be related, whereas memory operations from different flows, even if from the same source, may not be related. A portion of the FID (e.g. a source field) may identify the source, and the remainder of the FID may identify the flow (e.g. a flow field). Thus, an FID may be similar to a transaction ID, and some sources may simply transmit a transaction ID as an FID. In such a case, the source field of the transaction ID may be the source field of the FID and the sequence number (that identifies the transaction among transactions from the same source) of the transaction ID may be the flow field of the FID. Sources that group transactions as a flow, however, may use the FIDs differently. Alternatively, flows may be correlated to the source field (e.g., operations from the same source may be part of the same flow and operations from a different source are part of a different flow).

Thus, a given source may be configured to use QoS parameters to identify which memory operations are more important to the source (and thus should be serviced prior to other memory operations from the same source), especially for sources that support out-of-order data transmissions with respect to the address transmissions from the source. Furthermore, the QoS parameters may permit sources to request higher levels of service than other sources on the same port and/or sources on other ports.

In some embodiments, different traffic types may have different definitions of QoS parameters. That is, the different traffic types may have different sets of QoS parameters. The meaning of a given QoS parameter value depends on the set of QoS parameters from which it is drawn. For example, a set of RT QoS parameters may be defined and a set of NRT QoS parameters may be defined. Thus, an RT QoS parameter value is assigned meaning within the RT QoS parameter set and an NRT QoS parameter value is assigned meaning within the NRT QoS parameter set. Other embodiments may implement the same QoS parameter set on all ports or among all traffic types.

The memory controller 30 may be configured to process the QoS parameters received on ports 32 and 34 and may use the relative QoS parameter values to schedule memory operations received on the ports with respect to other memory operations from that port and with respect to other memory operations received on other ports. More specifically, the memory controller 30 may be configured to compare QoS parameters that are drawn from different sets of QoS parameters (e.g., RT QoS parameters and NRT QoS parameters) and may be configured to make scheduling decisions based on the QoS parameters.

The QoS parameters may thus be values that are transmitted with memory operations, and which may be used in memory controller 30 to identify requested QoS levels. The QoS levels may be relative to other levels, and may specify which memory operations should be selected prior to others having lower QoS levels. Thus, the QoS levels may function as a sort of priority after interpretation by the memory controller 30 to consider QoS levels defined in different sets, although the priority can be balanced by other factors.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
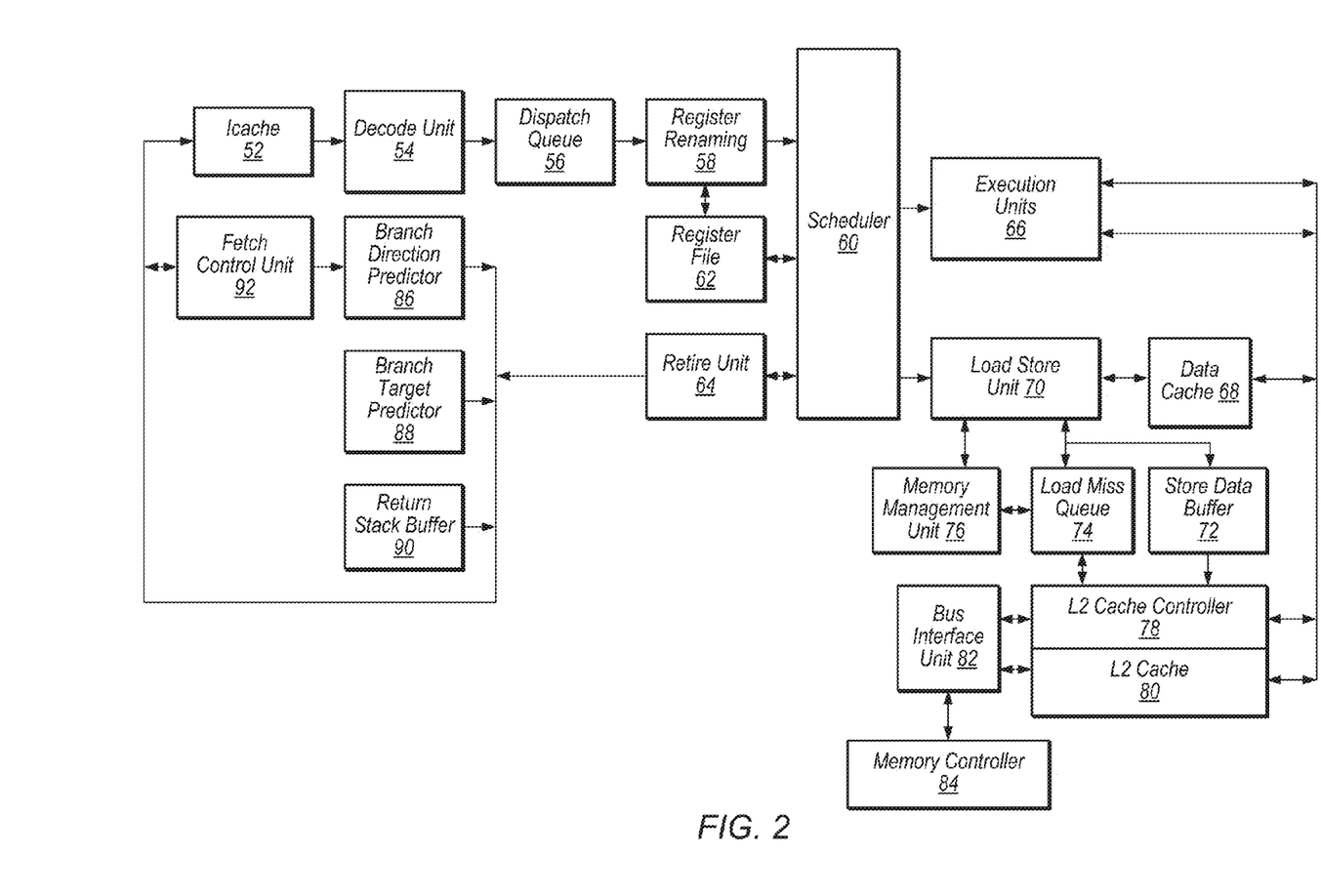
FIG. 2 is a block diagram of a processor pipeline in accordance with one or more embodiments.

Turning now to FIG. 2, a block diagram of one embodiment of a processor pipeline is shown. Much of the processor pipeline shown in FIG. 2 may be located within a processor (e.g., CPU 14 or 16 of FIG. 1). In the illustrated embodiment, the fetch control unit 92 is coupled to provide a program counter (PC) for fetching from the instruction cache 52. The fetch control unit 92 may comprise any circuitry used to generate PCs for fetching instructions. The fetch control unit 92 may be coupled to branch prediction hardware (branch direction predictor 86, branch target predictor 88, and return stack buffer 90) used to predict branch instructions and to fetch down the predicted path. The fetch control unit 92 may also be redirected (e.g., via misprediction, exception, interrupt, flush).

A predicted PC may be utilized to access the instruction cache 52 to read the next set of instruction data. When instructions are being fetched, if there is a miss in instruction cache 52, then an instruction stream demand miss memory request may be generated. Also, in response to the miss, instruction stream prefetch misses may also be generated for consecutive blocks, and the instructions from these blocks may or may not be executed. The instruction cache 52 may be coupled to provide instructions to the decode unit 54, which is coupled to provide decoded instructions to the dispatch queue 56. The dispatch queue 56 may be configured to store decoded instructions received from decode unit 54. The dispatch queue 56 may be coupled to register renaming unit 58, and register renaming unit 58 may be coupled to the scheduler 60. Register renaming unit 58 may be configured to map register names to physical registers.

The scheduler 60 may be coupled to the register file 62, and the register file 62 may be configured to provide operands and results to the register renaming unit 58. The register file 62 may generally comprise any set of registers usable to store operands and the results of instructions executed by execution units 66. In some embodiments, the register file 62 may comprise a set of physical registers and the scheduler 60 may map the logical registers to the physical registers. The logical registers may include both architected registers specified by the instruction set architecture (ISA) implemented by the CPU and temporary registers that may be used as destinations of operations for temporary results and sources of subsequent operations. In other embodiments, the register file 62 may comprise an architected register set containing the committed state of the logical registers and a speculative register set containing speculative register state.

The scheduler 60 may also be coupled to provide load and store operands for execution to the load store unit 70. The scheduler 60 may identify instructions without dependencies and issue these instructions to execution units 66 and load store unit 70. Execution units 66 may include one or more execution units (e.g., integer unit, floating point unit, vector unit). Execution units 66 may execute instructions over one or more clock cycles and write the results to data cache 68 and/or L2 cache 80 via L2 cache controller 78. Each of execution units 66 may be fully pipelined and may be configured to accept an instruction in every clock cycle. Execution of instructions may occur speculatively and out of order. The effect of the instruction execution may not be recorded until the speculative nature of the execution is resolved. Ultimately, instructions may be retired in order. Retire unit 64 may be configured to retire instructions, and retire unit 64 may handle exceptions in some embodiments.

The load store unit 70 may be coupled to scheduler 60, data cache 68, memory management unit 76, load miss queue 74, and store data buffer 72. The load store unit 70 may include various pipeline stages for performing memory access operations. For example, the load store unit 70 may include a first pipeline stage for generating addresses for load and store operations. Other pipeline stages may be configured for reading the tag store and the data store of data cache 68. The load store unit 70 may be configured to store load misses in load miss queue 74, and load store unit 70 may also be configured to write store addresses and store data to store data buffer 72. Store to load bypassing may be supported in load miss queue 74 if the store can source all of the data needed to satisfy the load. If the load requires additional data or partially hits on multiple entries in load miss queue 74, then the load may be replayed from scheduler 60.

The memory management unit (MMU) 76 may include a micro instruction translation lookaside buffer (micro-ITLB) and an ITLB. In one embodiment, the micro-ITLB may be direct mapped, and the ITLB may be 2-way set associative. The MMU 76 may also contain a dual-TLB (DTLB), and the DTLB may be 2-way set associative. The MMU 76 may also contain a large page array and a page descriptor array. A miss in the MMU 76 may initiate a hardware fill from the in-memory page table. Hardware table walks may read page table entries stored in memory and fill the MMU 76.

Instruction cache 52 and data cache 72 may be level 1 (L1) caches in this embodiment. In one embodiment, instruction cache 52 and data cache 72 may be cache writeback units configured to write information to L2 cache 80. Although not explicitly shown in FIG. 2, in some embodiments, L2 cache 80 may be shared by the L1 caches in two or more CPUs. L2 cache 80 may include a tag pipeline and a data pipeline. L2 cache controller 78 and L2 cache 80 may also be coupled to bus interface unit (BIU) 82. BIU 82 may also be coupled to memory controller 84, and memory controller 84 may be coupled to one or more memories (not shown).

In one embodiment, the processor pipeline shown in FIG. 2 may generate prefetch requests. Prefetching is an act of reading data into a cache before it is requested by the software, thus minimizing the data access latency. The corresponding prefetch data may be stored in instruction cache 52 and/or data cache 68. In one embodiment, fetch control unit 92 may be configured to concurrently maintain multiple separate, independent prefetch streams.

The CPU may detect patterns of access in the load/store traffic and identify streams for prefetching. Prefetch instructions may be executed by the CPU, and the prefetch instructions may identify the address to be prefetch, and may optionally supply one or more attributes to direct the prefetching activity. In another embodiment, the CPU may include one or more prefetch units (not shown) configured to generate prefetch requests and to prefetch data and instructions to one or more of the caches and possibly other blocks. It is noted that other embodiments may include other combinations of components, including subsets or supersets of the components shown in FIG. 2 and/or other components.

Figure 3:
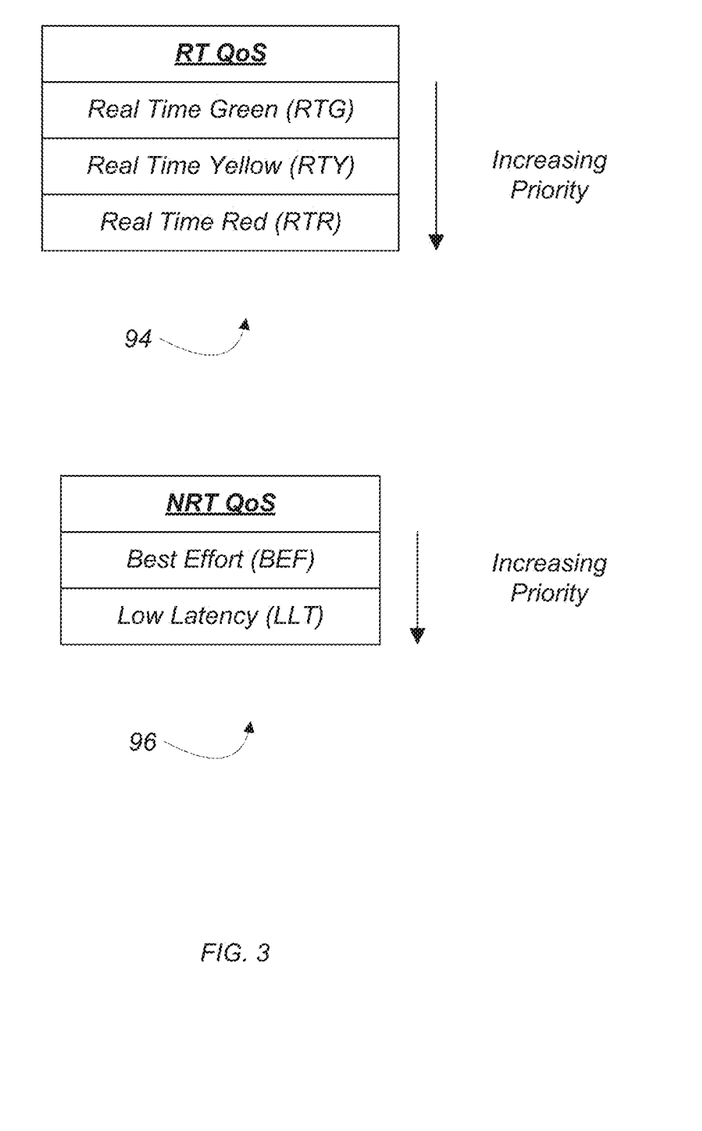
FIG. 3 is a pair of tables illustrating definitions of sets of QoS levels in accordance with one or more embodiments.

Referring now to FIG. 3, a pair of tables 94 and 96 are shown illustrating a definition of a set of real-time (RT) QoS levels and a set of non-real-time (NRT) QoS levels, respectively, for one embodiment. Other embodiments may include additional or substitute levels, and other embodiments may include additional levels in combination with a subset of the illustrated levels. As illustrated by the arrows pointing downward next to the tables 94 and 96 in FIG. 3, the tables illustrate the QoS levels within a set in increasing priority. That is, the real time green (RTG) QoS level is the lowest priority RT QoS level, the real time yellow (RTY) QoS level is the medium priority RT QoS level, and the real time red (RTR) QoS level is the highest priority RT QoS level. Similarly, the best effort (BEF) QoS level is the lowest priority NRT QoS level and the low latency (LLT) QoS level is the highest priority NRT QoS level. A memory controller (such as memory controller 30 of FIG. 1) may determine relative priorities of the RT QoS levels with regard to the NRT QoS levels based, in part, on other factors indicating the traffic that is being experienced by the memory controller across the various types and ports.

The RTG, RTY, and RTR QoS levels may reflect relative levels of urgency from an RT source. By treating operations having higher urgency with higher priority, the memory controller may return data to the RT source more quickly and may thus aid the correct operation of the RT source. The BEF NRT QoS level may be a request to return the data as quickly as the memory controller is able, once the needs of other flows of data are met. On the other hand, the LLT NRT QoS level may be a request for low latency data.

Figure 4:
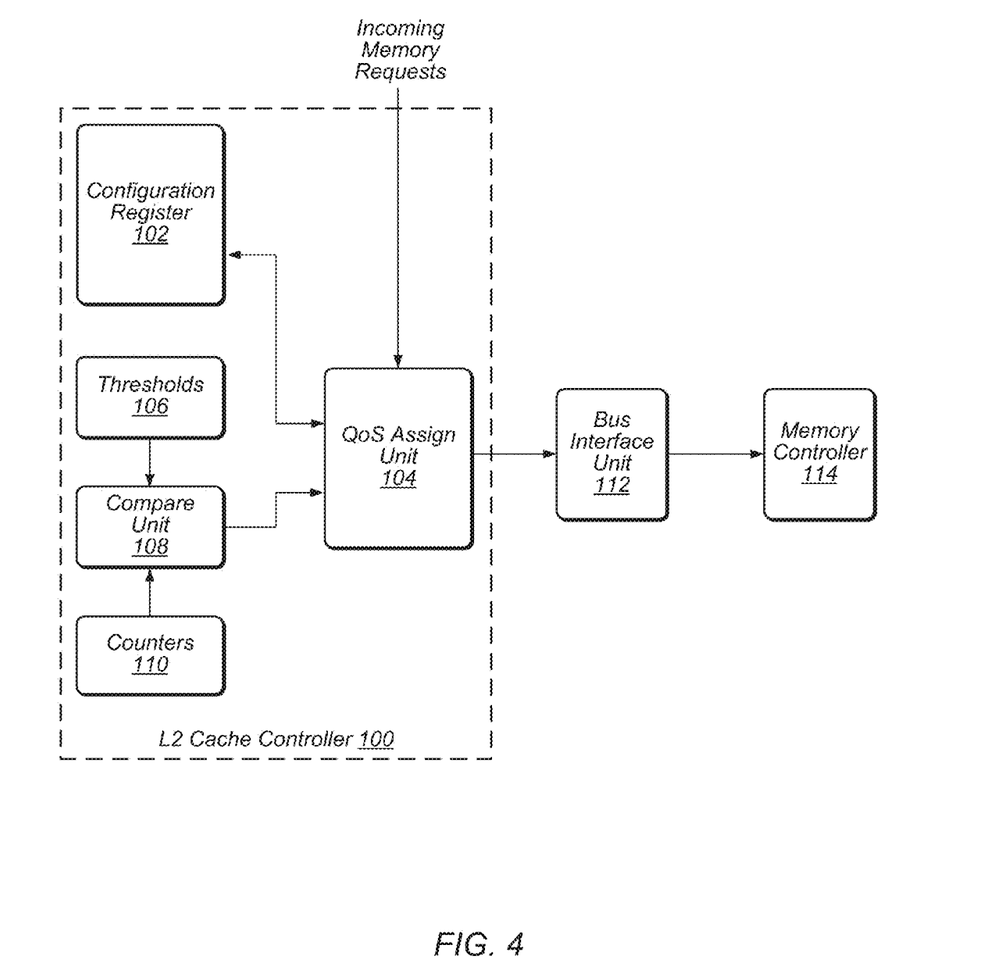
FIG. 4 is a block diagram of a L2 cache controller in accordance with one or more embodiments.

Turning now to FIG. 4, a block diagram of a L2 cache controller in accordance with one or more embodiments is shown. L2 cache controller 100 may be included within a processor complex (not shown), and L2 cache controller 100 may be configured to assign QoS levels to incoming memory requests. The memory requests may be conveyed to L2 cache controller 100 by one or more CPUs (not shown) and/or by one or more other devices (not shown). In one embodiment, L2 cache controller 100 may assign QoS levels to received memory requests. In another embodiment, cache controller 100 may change QoS levels of received memory requests if the memory requests have already been assigned QoS parameters, such as the memory requests received from I/O devices.

In one embodiment, the memory requests received by L2 cache controller 100 may be NRT memory requests and may be assigned NRT QoS levels. In another embodiment, the memory requests received by L2 cache controller 100 may be RT memory requests and may be assigned RT QoS levels. In a further embodiment, RT and NRT memory requests may be received by L2 cache controller 100, and these memory requests may be assigned corresponding QoS parameters from the various RT and NRT QoS levels.

L2 cache controller 100 may include configuration register 102, thresholds 106, compare unit 108, and counters 110. Counters 110 are representative of any number of counters which may be configured to track numbers of various types of outstanding memory requests. In one embodiment, counters 110 may actually be a single counter. In another embodiment, counters 110 may be multiple counters. For each counter in counters 110 there may be a corresponding threshold in thresholds 106. In one embodiment, thresholds 106 may be programmable such that each threshold may be software adjustable.

In one embodiment, there may be a separate counter for each CPU in the system, and each counter may monitor the number of outstanding memory requests generated by its corresponding CPU. In this way, if a first CPU has a large number of outstanding memory requests and a second CPU has a small number of outstanding memory requests, L2 cache controller 100 can fine-tune the treatment of new memory requests from the first and second CPUs. For example, new requests from the first CPU may be assigned a QoS parameter of best effort while new requests from the second CPU may be assigned a low latency QoS parameter. In another embodiment, a single counter may keep track of the number of outstanding memory requests from two or more CPUs. For example, in one embodiment, a single counter may keep track of all of the outstanding memory requests from multiple CPUs and one or more other devices. In some embodiments, counters 110 may include one or more counters for tracking specific types of memory requests. For example, counters 110 may include a counter for tracking the number of outstanding instruction stream demand misses from a first CPU.

In one embodiment, counters 110 may keep track of the number of outstanding memory requests by monitoring a queue (not shown) stored in BIU 112. Counters 110 may track how many credits are left in the queue to determine the number of outstanding memory requests per CPU. In another embodiment, counters 110 may use other methods and techniques for tracking the numbers of outstanding memory requests of the various CPUs and other devices.

In one embodiment, QoS assign unit 104 may only be utilized for assigning QoS parameters to read memory requests. In another embodiment, QoS assign unit 104 may be utilized for assigning QoS parameters to both read and write memory requests. In a further embodiment, QoS assign unit 104 may be utilized for assigning QoS parameters to a subgroup of memory requests that may include a portion of read memory requests and/or a portion of write memory requests, and the portions may be chosen based on memory request type (e.g., store miss, instruction stream prefetch miss, instruction stream demand miss).

In one embodiment, QoS assign unit 104 may be configured to assign QoS levels to memory requests received from CPU(s) and to pass through memory requests received from I/O devices unchanged. In this embodiment, QoS assign unit 104 may assign only NRT QoS levels to the CPU-generated memory requests. In another embodiment, if the CPU(s) generate only RT traffic, then QoS assign unit 104 may assign only RT QoS levels to memory requests. In a further embodiment, if the CPU(s) generate NRT and RT traffic, QoS assign unit 104 may assign NRT and RT levels to memory requests.

Configuration register 102 may be a read/write register and may include any number of entries for storing values associated with any number of different types of memory requests. The different types of memory requests may include the following types: store misses, demand loads, TLB misses, load prefetch misses, instruction stream demand misses, instruction stream prefetch misses, and various other types of memory requests. Configuration register 102 may include an entry with a control indicator for each type of memory request, and the control indicator may indicate if the threshold should be utilized in determining which QoS parameter to assign when a new memory request of that specific type is received by L2 cache controller 100. In one embodiment, the control indicator may be a single bit, and if the indicator bit is a first value ('1'), then the QoS parameter may be assigned based on the threshold-counter comparison, and if the indicator bit is a second value ('0'), then the threshold-counter comparison may not be performed, and all memory requests of that specific type may be assigned a predetermined QoS parameter.

After assigning QoS levels to the incoming memory requests, the memory requests may be conveyed to memory controller 114 via bus interface unit (BIU) 112. Some of the incoming I/O-device-generated memory requests received by L2 cache controller 100 may already have been assigned QoS levels by their respective sources. These memory requests, if they miss in the L2 cache (not shown), may maintain their original QoS level and may be conveyed to memory controller 114 via BIU 112. In another embodiment, some or all of these memory requests may have their QoS levels changed based on the outcome of the comparisons performed by compare unit 108 as previously described. It is noted that in other embodiments, one or more of the units shown as being located within L2 cache controller 100 may be located elsewhere in the integrated circuit (e.g., bus interface unit, load store unit).

Figure 5:
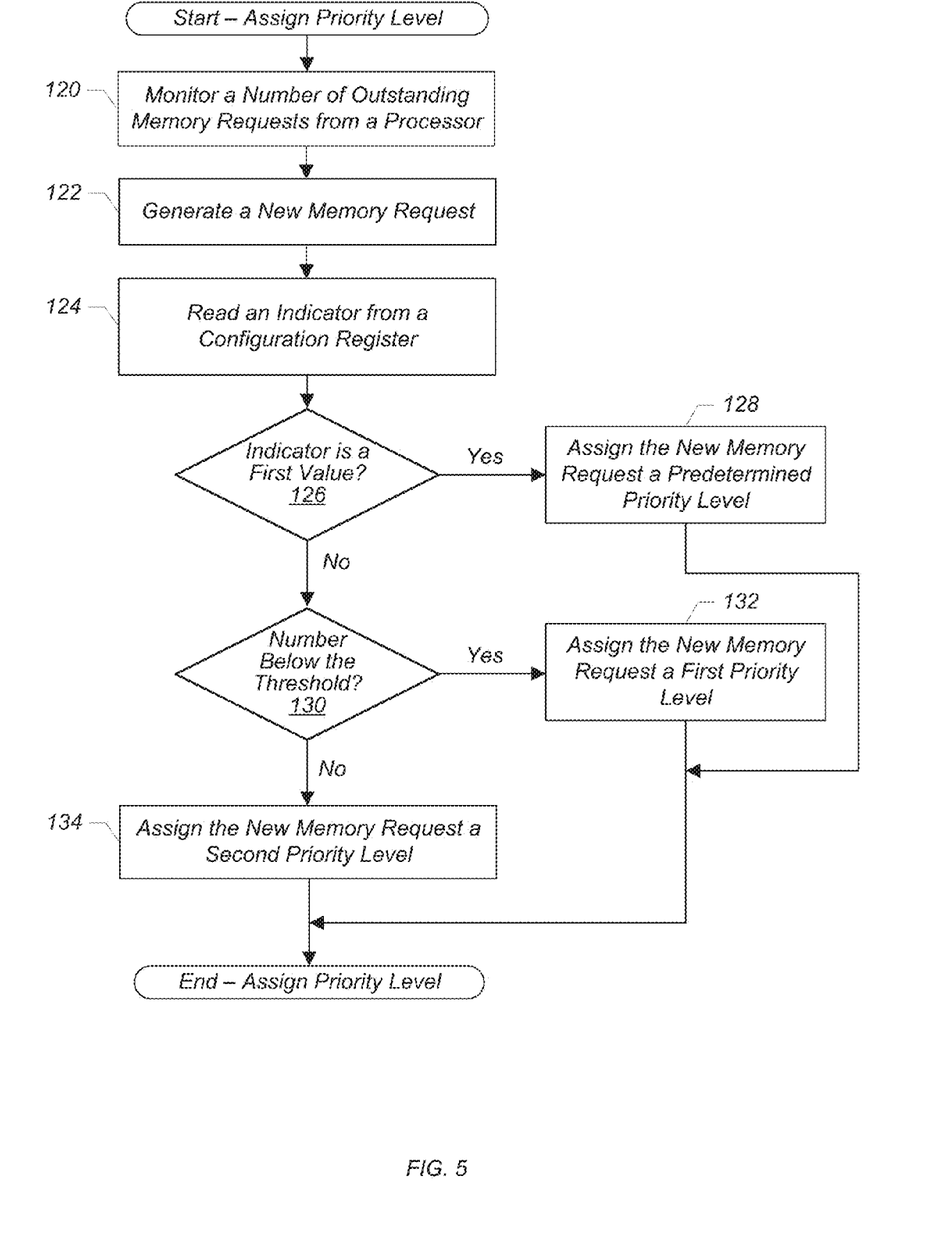
FIG. 5 is a generalized flow diagram illustrating one embodiment of a method for assigning priority levels to memory requests.

Referring now to FIG. 5, one embodiment of a method for priority levels to memory requests is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, the number of outstanding memory requests from a processor may be monitored (block 120). In one embodiment, the number of outstanding memory requests may be monitored in a L2 cache controller. In another embodiment, the number may be monitored by a different unit. Next, a new memory request may be generated (block 122). In one embodiment, the new memory request may be generated by a processor and conveyed to a L2 cache controller. In another embodiment, the new memory request may be conveyed to another type of cache or to a control unit. Next, an indicator corresponding to the request type of the new memory request may be read from a configuration register (block 124). The indicator may be stored in an entry of the configuration register, and the indicator may specify if that specific type of memory request should be assigned a fixed QoS parameter or if the QoS parameter should be dependent on the number of outstanding memory requests. In one embodiment, the indicator may be a single bit.

If the indicator is a first value (conditional block 126), then the new memory request may be assigned a predetermined priority level (block 128). The predetermined priority level may be assigned regardless of the number of outstanding memory requests. The indicator may be set to the first value for types of memory requests that are not adversely affected by increased latency. For example, in one embodiment, it may be determined that setting instruction stream prefetches requests to a QoS level of best effort in all cases may not adversely impact processor performance. This determination may be based on an analysis of simulation or actual performance data for a specific type of application that is running on the processor. For other applications, the settings may be changed depending on the specific performance issues of each application.

If the indicator is a second value (conditional block 126), then the new memory request may be assigned a QoS parameter based on a comparison of the number of outstanding memory requests to a programmable threshold (conditional block 130). If the number of outstanding memory requests is below the threshold (conditional block 130), then the new memory request may be assigned a first priority level (block 132). In one embodiment, the first priority level may be a QoS parameter of low latency. If the number of outstanding memory requests is above the threshold (conditional block 130), then the new memory request may be assigned a second priority level (block 134). The second priority level may be a lower priority than the first priority level. In one embodiment, the second priority level may be a QoS parameter of best effort.

Figure 6:
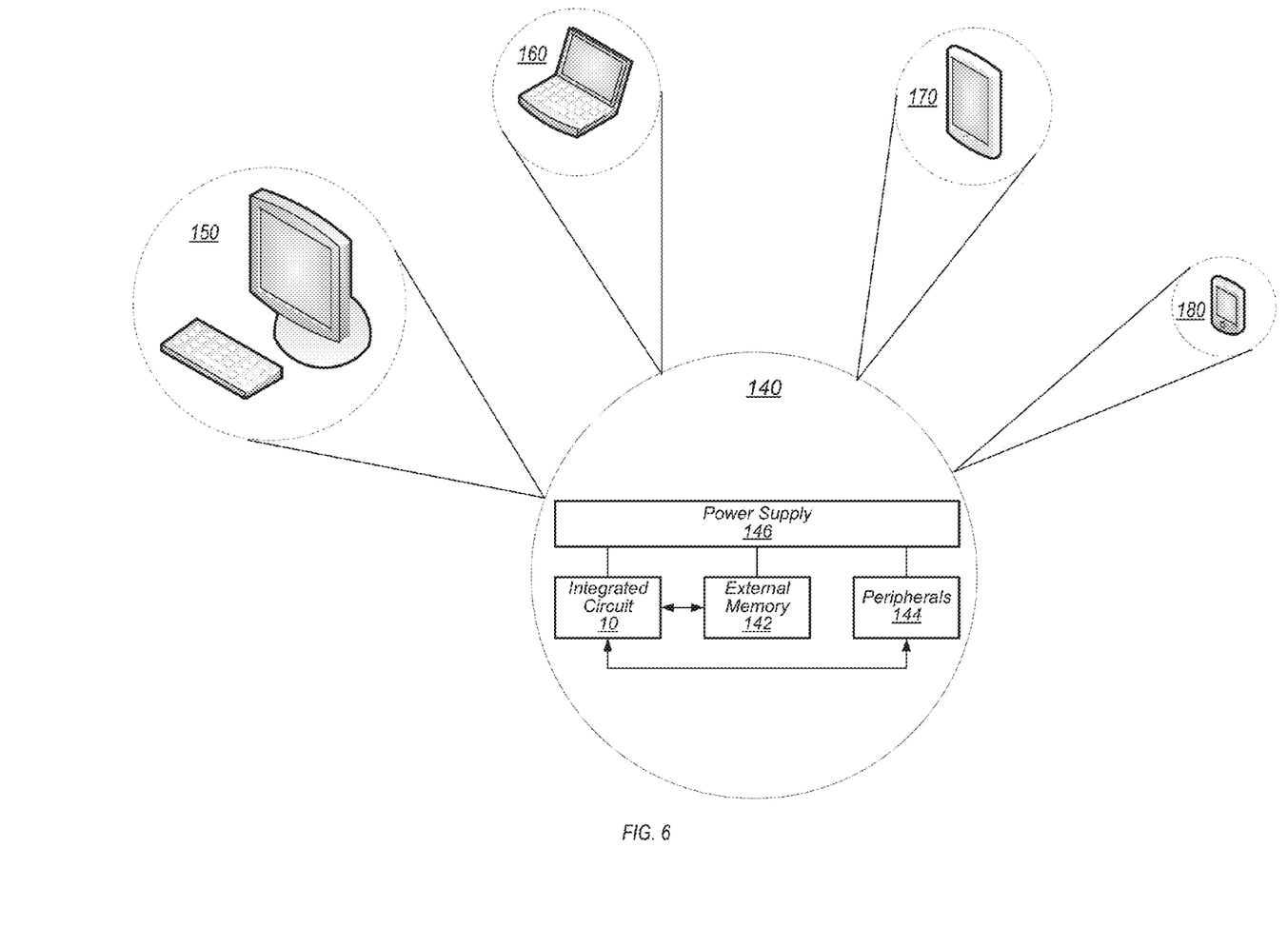
FIG. 6 is a block diagram of one embodiment of a system.

Turning next to FIG. 6, a block diagram of one embodiment of a system 140 is shown. As shown, system 140 may represent chip, circuitry, components, etc., of a desktop computer 150, laptop computer 160, tablet computer 170, cell phone 180, or otherwise. In the illustrated embodiment, the system 140 includes at least one instance of an integrated circuit 10 (of FIG. 1) coupled to an external memory 142.

The integrated circuit 10 is coupled to one or more peripherals 144 and the external memory 142. A power supply 146 is also provided which supplies the supply voltages to the integrated circuit 10 as well as one or more supply voltages to the memory 142 and/or the peripherals 144. In various embodiments, power supply 146 may represent a battery (e.g., a rechargeable battery in a smart phone, laptop or tablet computer). In some embodiments, more than one instance of the integrated circuit 10 may be included (and more than one external memory 142 may be included as well).

The memory 142 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMM5), etc. Alternatively, the devices may be mounted with an integrated circuit 10 in a chip-on-chip configuration, a package-on-package configuration, or a multi-chip module configuration.

The peripherals 144 may include any desired circuitry, depending on the type of system 140. For example, in one embodiment, peripherals 144 may include devices for various types of wireless communication (e.g., wifi, Bluetooth, cellular, global positioning system). The peripherals 144 may include additional storage, such as RAM storage, solid state storage, or disk storage. The peripherals 144 may include user interface devices such as a display screen, including touch display screens or multitouch display screens, keyboard or other input devices, microphones, speakers, etc.

Figure 7:
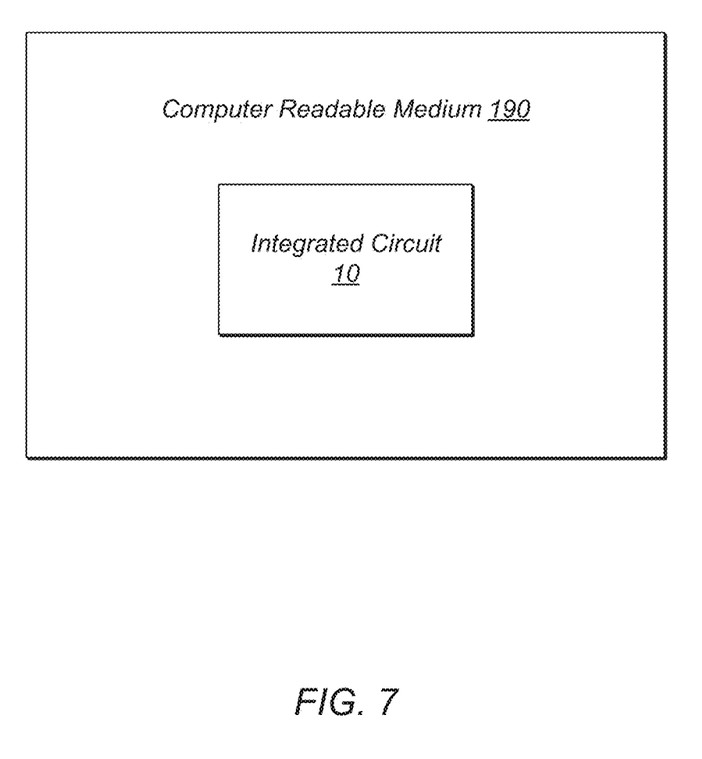
FIG. 7 is a block diagram of one embodiment of a computer readable medium.

Turning now to FIG. 7, one embodiment of a block diagram of a computer readable medium 190 including one or more data structures representative of the circuitry included in the integrated circuit (IC) 10 (of FIG. 1) is shown. Generally speaking, computer readable medium 190 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 190 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 190 may be the netlist(s) (with or without the synthesis library) or the data set(s), as desired. In yet another alternative, the data structures may comprise the output of a schematic program, or netlist(s) or data set(s) derived therefrom.

While computer readable medium 190 includes a representation of the IC 10, other embodiments may include a representation of any portion or combination of portions of the IC 10 (e.g., L2 cache 18, L2 cache controller 20, BIU 26, processor complex 12).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   one or more processors configured to issue a plurality of memory requests; and
   a level two (L2) cache controller coupled to the one or more processors, wherein
      the L2 cache controller is configured to:
         receive the plurality of memory requests from the one or more processors;
         monitor a number of outstanding memory requests;
         assign a first quality of service (QoS) parameter to a given memory request responsive to the number being less than a threshold; and
         assign a second QoS parameter to the given memory request if the number is greater than the threshold, wherein the second QoS parameter is a lower priority than the first QoS parameter.

2. The apparatus as recited in claim 1, further comprising one or more input/output (I/O) devices, wherein the L2 cache controller is further configured to receive a plurality of memory requests from the one or more I/O devices.

3. The apparatus as recited in claim 2, wherein the number of outstanding memory requests only includes memory requests issued by the one or more processors.

4. The apparatus as recited in claim 3, further comprising a memory controller and a memory coupled to the memory controller, wherein the L2 cache controller is further configured to convey the given memory request with an assigned QoS parameter to the memory controller.

5. The apparatus as recited in claim 4, further comprising a bus interface unit (BIU), wherein the L2 cache controller is configured to convey the given memory request to the memory controller via the BIU.

6. The apparatus as recited in claim 5, wherein memory requests from the one or more I/O devices are received on an advanced coherency port (ACP) of the BIU.

7. The apparatus as recited in claim 1, wherein the threshold is programmable.

8. The apparatus as recited in claim 1, wherein the first QoS parameter is low latency and wherein the second QoS parameter is best effort.

9. A level two (L2) cache controller configured to:
   receive a plurality of memory requests from two or more processors;
   monitor a first number of outstanding memory requests issued by a first processor;
   monitor a second number of outstanding memory requests issued by a second processor;
   assign a first quality of service (QoS) parameter to a given memory request from the first processor responsive to determining the first number is less than a first threshold;
   assign a second QoS parameter to the given memory request from the first processor responsive to determining the first number is greater than the first threshold;
   assign a first QoS parameter to a given memory request from the second processor responsive to determining the second number is greater than a second threshold; and
   assign a second QoS parameter to the given memory request from the second processor responsive to determining the second number is greater than the second threshold, wherein the second QoS parameter is of a lower priority than the first QoS parameter.

10. The L2 cache controller as recited in claim 9, wherein the plurality of memory requests comprises a plurality of types of memory requests, and wherein the L2 cache controller is further configured to read a configuration register to determine whether to assign a QoS parameter based on a comparison of a number of outstanding memory requests to a threshold for a given type of memory request.

11. The L2 cache controller as recited in claim 10, wherein a first type of memory request is a store miss.

12. The L2 cache controller as recited in claim 11, wherein a second type of memory request is an instruction stream demand miss.

13. The L2 cache controller as recited in claim 12, wherein a third type of memory request is an instruction stream prefetch miss.

14. A method comprising:
   monitoring a number of outstanding memory requests;
   generating a new memory request, wherein the new memory request is generated by a processor;
   assigning the new memory request a first quality of service (QoS) parameter if the number of outstanding memory requests is below a threshold;
   assigning the new memory request a second QoS parameter if the number of outstanding memory requests is above the threshold; and
   subsequent to generating the new memory request, the method comprises:
      looking up an indicator in a configuration register, wherein the indicator is stored in a configuration register entry corresponding to the memory request type of the new memory request;
      assigning a predetermined QoS parameter for the new memory request if the indicator is a first value; and
      assigning a QoS parameter to the new memory request based on a comparison of the number of outstanding memory requests to the threshold if the indicator is a second value.

15. The method as recited in claim 14, wherein the second QoS parameter is at a lower QoS level than the first QoS parameter.

16. A method comprising:
   receiving a memory request at a level 2 (L2) cache controller;
   comparing a count of outstanding memory requests to a threshold;
   responsive to the count being less than the threshold, assigning a first priority level to the memory request; and
   responsive to the count being greater than the threshold, assigning a second priority level to the memory request, wherein the second priority level is lower than the first priority level.

17. The method as recited in claim 16, wherein the memory request is generated by a processor, and wherein the outstanding memory requests include only memory requests generated by the processor.

18. The method as recited in claim 16, further comprising:
   conveying the memory request to a memory controller; and
   scheduling the memory request to a memory channel by the memory controller, wherein the scheduling is based on the assigned priority level.

19. The method as recited in claim 16, wherein subsequent to receiving the memory request at the L2 cache controller, the method further comprising reading a configuration register to determine if the count should be compared to the threshold.

20. The method as recited in claim 19, wherein the configuration register comprises a plurality of entries for a plurality of types of memory requests, wherein the configuration register comprises an entry for a memory request type of the received memory request, and wherein the entry comprises an indicator to designate if the count should be compared to the threshold.

* * * * *